US007451640B2

(12) United States Patent
Asano et al.

(10) Patent No.: US 7,451,640 B2
(45) Date of Patent: Nov. 18, 2008

(54) SMOLDERING DETERMINATION METHOD OF INTERNAL COMBUSTION ENGINE

(75) Inventors: Morita Asano, Ikeda (JP); Mitsuhiro Izumi, Osaka (JP)

(73) Assignees: Daihatsu Motor Co., Ltd. (JP); Diamond Electric Mfg. Co., Ltd. (JP)

( * ) Notice: Subject to any disclaimer, the term of this patent is extended or adjusted under 35 U.S.C. 154(b) by 100 days.

(21) Appl. No.: 11/659,659

(22) PCT Filed: Aug. 3, 2005

(86) PCT No.: PCT/JP2005/014222

§ 371 (c)(1),
(2), (4) Date: Feb. 7, 2007

(87) PCT Pub. No.: WO2006/018976

PCT Pub. Date: Feb. 23, 2006

(65) Prior Publication Data

US 2007/0245995 A1 Oct. 25, 2007

(30) Foreign Application Priority Data

Aug. 20, 2004 (JP) ............................ 2004-240642

(51) Int. Cl.
*G01M 15/00* (2006.01)

(52) U.S. Cl. ................................ 73/114.67; 73/114.77

(58) Field of Classification Search ................ 73/35.07, 73/35.08, 114.37, 114.58, 114.62, 114.67, 73/114.77
See application file for complete search history.

(56) References Cited

U.S. PATENT DOCUMENTS 5,193,514 A * 3/1993 Kobayashi et al. .......... 123/634
5,241,937 A 9/1993 Kanehiro et al.
5,396,176 A * 3/1995 Ishii et al. .................... 324/388
6,691,555 B2 * 2/2004 Ohkama et al. ............ 73/35.08
7,348,782 B2 * 3/2008 Ando ......................... 324/399
2002/0144544 A1 * 10/2002 Kesler ........................ 73/118.1
2003/0006774 A1 * 1/2003 Ohkama et al. ............ 324/382
2003/0183195 A1 10/2003 Uchida et al.
2006/0238144 A1 * 10/2006 Ando ......................... 315/307
2008/0028842 A1 * 2/2008 Asano et al. .................. 73/116
2008/0030197 A1 * 2/2008 Fukumura et al. ........... 324/393

FOREIGN PATENT DOCUMENTS

JP 5-263745 A 10/1993
JP 11-36971 A 2/1999
JP 2003-286932 A 10/2003
JP 2004-108298 4/2004

* cited by examiner

*Primary Examiner*—Eric S McCall
(74) *Attorney, Agent, or Firm*—Banner & Witcoff, Ltd.

(57) ABSTRACT

According to the present invention, in a spark ignition-type internal combustion engine which has a spark plug and mounted in a vehicle, an ion current generated in a combustion chamber through the spark plug after ignition is detected and smoldering of the spark plug is determined on the basis of the detected ion current. An operation state of the internal combustion engine is detected and smoldering of the spark plug is determined based on that the detected ion current satisfies a predetermined condition when the detected operation state falls within an operation determination range set corresponding to an operation range in which an intake port pressure close to an atmospheric pressure is achieved using predetermined engine speed as an upper limit and a predetermined intake port pressure as a lower limit.

5 Claims, 5 Drawing Sheets

SMOLDERING DETERMINATION METHOD OF INTERNAL COMBUSTION ENGINE

This application is a national stage application of co-pending PCT application PCT/JP2005/014222 filed Aug. 3, 2005, which was published in Japanese under PCT Article 21(2) on Feb. 23, 2006, which claims the benefit of Japanese non-provisional application serial number 2004-240642 filed, Aug. 20, 2004, the disclosure of which is expressly incorporated herein.

TECHNICAL FIELD

The present invention relates to a method for determining smoldering of a spark plug by using an ion current in a spark ignition type internal combustion engine.

BACKGROUND ART

Conventionally, a spark ignition type internal combustion engine detects an ion current generated in a combustion chamber after ignition by using a spark plug and detects an operation state of the internal combustion engine such as knocking and combustion limit from magnitude and generation time of the detected ion current to adjust ignition timing or correct a fuel injection amount on the basis of the detection result. In detecting the ion current by using the spark plug, if the spark plug has no defect, the ion current can be detected at each ignition.

Generally, in the spark plug, there may occur the state called as smoldering in which carbon contained in soot generated by burning an air-fuel mixture is adhered to an electrode or an insulator in the vicinity of the electrode. When smoldering is generated in this manner, in detecting the ion current, a leak current is overlapped on the ion current. In a high rotational operation state with short ignition interval, when the ion current is detected before the leak current overlapped on the ion current disappears, it is determined as if the leak current continues. Thus, it may be wrongly determined that the sparkplug is short-circuited. For this reason, it is necessary to detect smoldering and discriminate smoldering and short-circuit of the spark plug.

In consideration with such circumstances, for example, as described in Patent document 1, by forbidding determination of smoldering of the spark plug when the engine rotational speed of the internal combustion engine falls within a predetermined speed range, smoldering is not determined in the state where whether smoldering or short-circuit of the spark plug cannot be determined, specifically, where ignition timing of one cylinder overlaps a period during which the ion current is detected in the other cylinder.

Patent document 1: Unexamined Patent Publication No. 2004-108298

DISCLOSURE OF THE INVENTION

Problem to be Solved by the Invention

In the above-mentioned internal combustion engine, even under the same engine rotational speed, when a load applied to the internal combustion engine is increased, combustion temperature becomes higher. Accordingly, temperature of the spark plug also becomes higher and the amount of adhered carbon is decreased. As a result, the time elapsed until the leak current caused by smoldering is shortened. In such situation, since the leak current is attenuated and disappears in the ion current detection period, it is easy to discriminate the actual short-circuit state from the pseudo state due to the leak current. However, in Patent document 1, smoldering cannot be determined in such operation state.

As a result, since smoldering cannot be determined in the operation range in which the load of the internal combustion engine becomes large, the determination accuracy is lowered.

An object of the present invention is to solve such a problem.

Means for Solving Problem

That is, according to a smoldering determination method of internal combustion engine in the present invention, in an internal combustion engine which is of a spark ignition type and has a spark plug and is mounted in a vehicle, an ion current generated in a combustion chamber through the spark plug after ignition is detected and smoldering of the spark plug is determined on the basis of the detected ion current. In addition, an operation state of the internal combustion engine is detected and smoldering of the spark plug is determined on the basis that the detected ion current satisfies a predetermined condition when the detected operation state falls within an operation determination range set corresponding to an operation range in which an intake port pressure close to an atmospheric pressure is achieved using predetermined engine speed as an upper limit and a predetermined intake port pressure as a lower limit.

With such a configuration, by setting the operation determination range corresponding to the operation range in which the intake port pressure close to the atmospheric pressure is achieved using the predetermined engine speed as the upper limit and the predetermined intake port pressure as the lower limit, enough time for the leak current caused by smoldering to disappear in the ion current detection period can be ensured. Accordingly, since the leak current can be discriminated from the ion current during normal combustion, determination accuracy of smoldering is improved.

With the above-mentioned configuration, in the case where the operation state of the internal combustion engine changes depending on the driving state of the vehicle and the state of the load, in order not to wrongly determine smoldering, when the internal combustion engine is in an operation state other than a no-load operation state, it is preferred that the operation determination range is made narrower.

As a predetermined condition for determining smoldering of the spark plug, it is preferred that the generation period of the detected ion current exceeds a threshold value set based on the ion current in the normal combustion state and the number of times the generation period exceeds the threshold value is the number of times for determination or more.

In addition, as a specific example of making the operation determination range narrower, as the engine speed is increased, the intake port pressure becomes higher.

Furthermore, the operation state is detected on the basis of the engine speed and the intake port pressure.

Effect of the Invention

As described above, according to the present invention, since the operation determination range is set corresponding to the operation range in which the intake port pressure close to the atmospheric pressure is achieved using the predetermined engine speed as the upper limit and the predetermined intake port pressure as the lower limit, enough time for the leak current caused by smoldering to disappear in the ion current detection period can be ensured. Accordingly, since the leak current can be easily discriminated from the ion current during normal combustion, determination accuracy of smoldering can be improved.

BEST MODE FOR CARRYING OUT THE INVENTION

Figure 1:
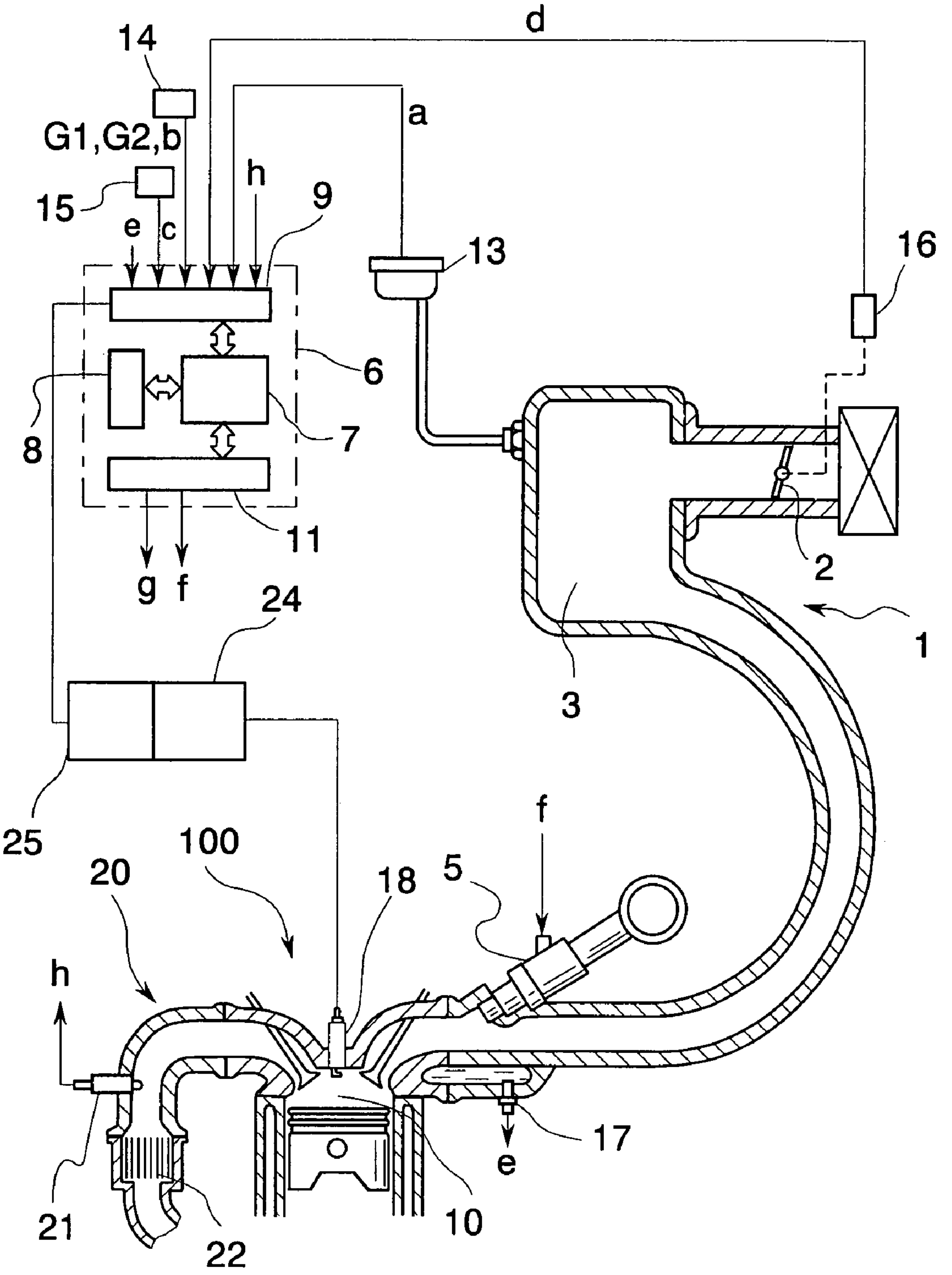
FIG. 1 is an explanation view showing a schematic configuration of an engine and an electronic control device in accordance with an embodiment of the present invention.

Hereinafter, an embodiment of the present invention will be described with reference to drawings. An engine 100 schematically shown in FIG. 1 is a multiple cylinder engine for automobiles. In the engine 100, a throttle valve 2 which opens/closes in response to an accelerator pedal not shown is disposed and a surge tank 3 is provided downstream of the throttle valve 2 in an intake system 1. A fuel injection valve 5 is provided in the vicinity of one end of the intake system 1 communicating to the surge tank 3. Opening of the fuel injection valve 5 is controlled by an electronic control device 6 on the basis of basic injection quantity described later. A spark plug 18 is attached at a position corresponding to a ceiling of a combustion chamber 10. In the exhaust system 20, an $O_2$ sensor for measuring oxygen concentration of exhaust gas is attached at a position upstream of a three-way catalyst 22 placed in a duct extending to a muffler not shown. In FIG. 1, a configuration of a single cylinder is shown as typical configuration.

The electronic control device 6 is mainly composed of a microcomputer system having a CPU (central processing unit) 7, a memory 8, an input interface 9 and an output interface 11. An intake pressure signal a output from an intake pressure sensor 13 for detecting pressure in the surge tank 3 as an intake port pressure, a cylinder determination signal G1, a crank angle reference position signal G2 and an engine speed signal b which are output from a cam position sensor 14 for detecting rotation state of the engine 100, a vehicle speed signal c output from a vehicle speed sensor 15 for detecting vehicle speed, an LL signal d output from an idle switch 16 for detecting open/close state of the throttle valve 2, a water temperature signal e output from a water temperature sensor 17 for detecting cooling water temperature of the engine and a current signal h output from the $O_2$ sensor 21 are input to the input interface 9. On the other hand, the output interface 11 outputs a fuel injection signal f to the fuel injection valve 5 and an ignition pulse g to the spark plug 18.

A bias power supply 24 and an ion current measurement circuit 25 for measuring ion current are connected to the spark plug 18. Various circuits which are known in the related art may be used as the ion current measurement circuit 25 itself including the bias power supply 24. After ignition, the bias power supply 24 applies voltage to the spark plug 18 so as to pass the ion current into the combustion chamber 10. The ion current measurement circuit 25 is electrically connected to the input interface 9 of the electronic control device 6, measures the ion current generated by application of voltage in an analog manner and inputs an analog signal corresponding to the generated ion current to the electronic control device 6.

The electronic control device 6 stores a program for correcting basic injection time according to various correction coefficients determined depending on an engine state on the basis of the intake pressure signal a output from the intake pressure sensor 13 and the engine speed signal b output from the cam position sensor 14 as main information to obtain valid injection time, determining fuel injection valve opening time, that is, injector final conducting time on the basis of the valid injection time, controlling the fuel injection valve 5 by the determined conducting time and injecting fuel corresponding engine load from the fuel injection valve 5.

The electronic control device 6 also stores a program for detecting the ion current generated in the combustion chamber 10 through the spark plug 18 after ignition and determining smoldering of the spark plug 18 on the basis of the detected ion current, more specifically, a program for detecting operation state of the engine 100 and determining smoldering of the spark plug on the basis that the detected ion current satisfies a predetermined condition when the detected operation state falls within a range of engine speed less than predetermined engine speed and within an operation determination range set in a load range closer to atmospheric pressure than predetermined intake port pressure.

In this embodiment, the ion current is detected by converting ion generation period in ion current detection period TDP between ignition and end of the exhaust stroke on the crank angle basis. For this reason, when the engine 100 is operated at low speed, the ion current detection period TDP becomes long and when the engine 100 is operated at high speed, the ion current detection period TDP becomes short.

Figure 2:
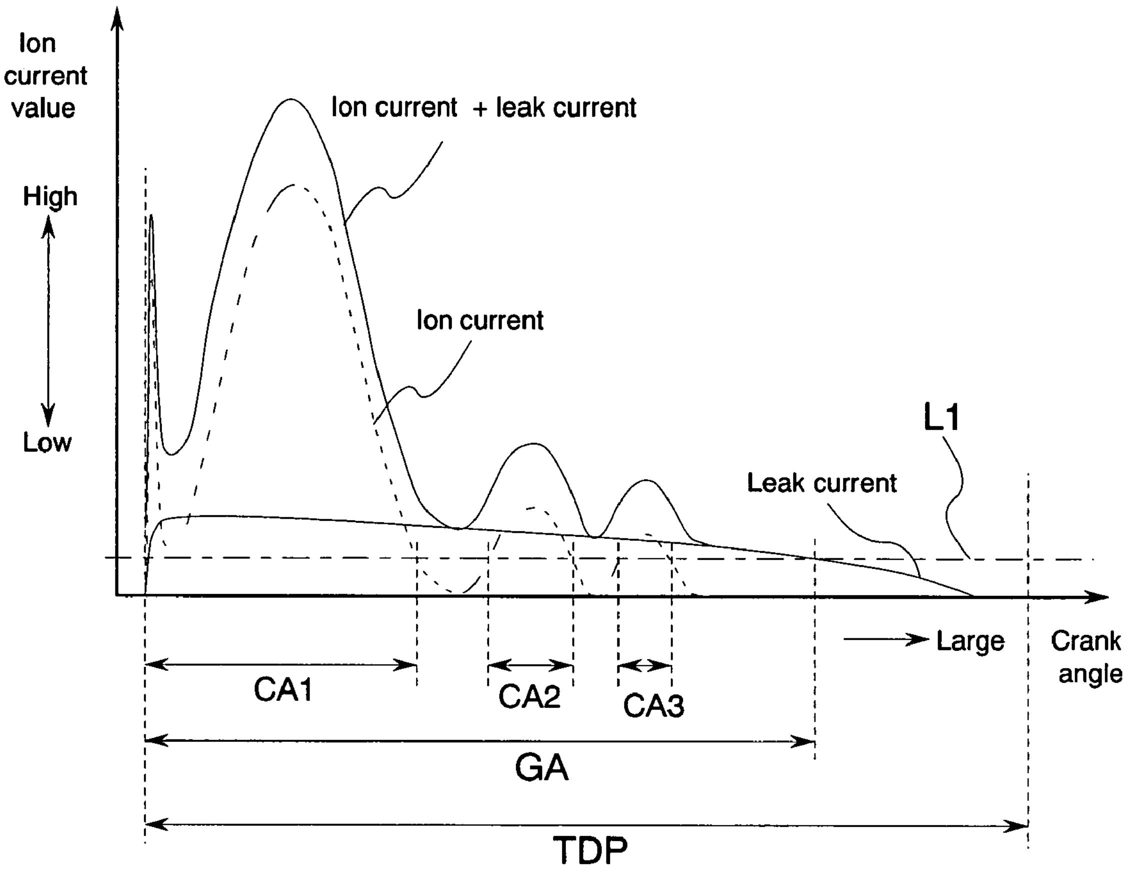
FIG. 2 is a graph showing a relationship among an ion current, a leak current and a generation angle in accordance with the embodiment.

As shown by a dotted line in FIG. 2, when bias voltage is applied to the spark plug 18 from the bias power supply 24 immediately after ignition, in the case of normal combustion, the ion current passes rapidly and then, decreases in the vicinity of the top dead center TDC in the expansion stroke. Then, the ion current increases again and flows into the combustion chamber so as to become maximum in the vicinity of the crank angle at which combustion pressure becomes maximum. In each cylinder, a period during which the ion current presenting such behavior is generated (passes) (hereinafter referred to as a generation angle GA) is measured at each ignition on a crank angle basis.

Specifically, by comparing the ion current output from the ion current measurement circuit 25 through the spark plug 18 with a reference level L1 set so that the leak current caused by smoldering of the spark plug 18 may be detected and measuring the generation period of the ion current having a current value of the reference level L1 or higher, that is, the generation angle GA in the ion current detection period TDP, the ion current is detected. Specifically, a crank angle reference position signal G2 output from the cam position sensor 14 is calculated from the point when the ion current value becomes the reference level L1 or higher and calculation of the crank angle reference position signal G2 is stopped at the point when the ion current value becomes a value less than the reference level L1 to measure the generation angle GA of the ion current. The generation angle GA is stored in the memory 8 temporarily, that is, until the determination of smoldering mentioned below. As shown in FIG. 2, when the ion current occurs and disappears in a repeated manner in the ion current detection period TDP, angles (shown by CA1, CA2 and CA3 in FIG. 2) at which the ion current value is the reference level L1 or higher are each measured and the measured angles are totaled. The total angle is defined as the generation angle GA of the ion current.

To detect the leak current, the reference level L1 is set as a value smaller than the average current value of the leak current. Thus, even a very small leak current can be detected and in the state where the leak current is not generated, the ion current can be accurately detected until immediately before its disappearance.

Figure 3:
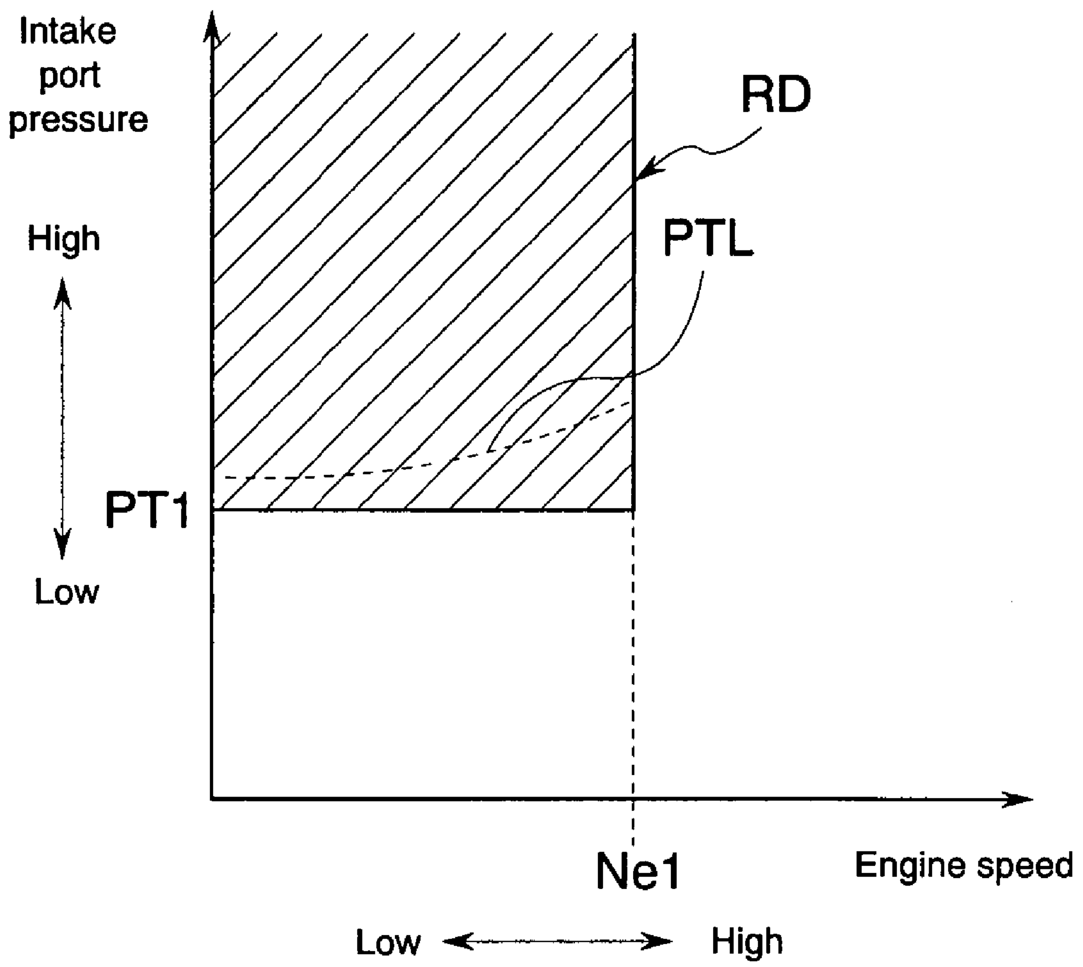
FIG. 3 is a graph showing a relationship between engine speed and intake port pressure which define an operation determination range in accordance with the embodiment.

Next, an operation determination range RD is set on the basis of the engine speed and the intake port pressure. FIG. 3 schematically shows the operation determination range RD. That is, a predetermined engine speed Ne1 defining the operation determination range RD is set as the upper limit engine speed which exceeds capable of ensuring time enough for disappearance of the leak current by smoldering in the ion current detection period TDP, for example, engine speed of about 3000 rpm. Similarly, a predetermined intake port pressure PT1 is set as a lower limit intake port pressure which has a low combustion temperature and hardly increases temperature of the ignition plug 18. Specifically, the predetermined intake port pressure PT1 corresponds to the intake port pressure necessary for performing control so that the engine speed may be idle target engine speed in an idle operation state where no load is applied to the engine 100. Thus, the operation determination range RD is set in the engine speed range lower than the predetermined engine speed Ne1 and in a range of intake port pressure closer to atmospheric pressure than the predetermined intake port pressure PT1.

In the case where the spark plug 18 smolders, when voltage is applied to the spark plug 18 to detect the ion current, the leak current flows to the spark plug 18 due to smoldering. As shown in FIG. 2, the leak current is attenuated as the time advances and then disappears.

In a low rotational range corresponding to the operation range in which the engine 100 is operated at low engine speed above the idle engine speed, the crank angle in the ion current detection period TDP is the same as in a high rotational range. However, due to the low engine speed, the ion current detection period TDP becomes longer. Thus, enough time that the generated leak current disappears in the ion current detection period TDP can be ensured. In other words, during the period from disappearance of the leak current to end of the ion current detection period TDP, there occurs the state where the currents detected through the spark plug 18, that is, the ion current and the leak current, are not generated. Thus, by operating the engine 100 on trial in the smoldering state of the spark plug 18, obtaining engine speed at which the leak current disappears in the ion current detection period TDP while gradually changing the engine speed and defining the obtained engine speed as the predetermined engine speed Ne1, such low rotational range is set as the operation range until the engine speed reaches predetermined engine speed Ne1. In this case, the obtained engine speed needs to exceed the idle engine speed.

In the high rotational range other than the low rotational range, the ion current detection period TDP becomes shorter due to high engine speed and enough time for disappearance of the leak current cannot easily ensured. However, in the state where the engine 100 is operated at high engine speed, since combustion temperature becomes higher, thereby making the temperature of the spark plug 18 higher, carbon adhering to the spark plug 18 is decreased and the leak current becomes smaller, the leak current disappears in the ion current detection period TDP. On the other hand, when the temperature of the spark plug 18, a self-cleaning function of the spark plug 18 is carried out and carbon is removed from the spark plug 18. Consequently, since the smoldering state does not substantially continue, that is, smoldering is relieved during operation, smoldering does not need to be determined in this operation range. The self-cleaning function of the spark plug 18 is carried out in the high load operation range.

Next, the operation range closer to the atmospheric pressure than the predetermined intake port pressure PT1 corresponds to the operation range except for the intake port pressure range in which the ion current is generated over almost all of the ion current detection period TDP. That is, in the low intake port pressure range other than the above-mentioned operation range, fuel amount in the air-fuel mixture is decreased and thus, combustion is extended. For this reason, since the ion current generation period becomes longer and the ion current is detected after the leak current disappears, there occurs the case where the leak current cannot be discriminated from the ion current. Therefore, such low intake port pressure range is eliminated.

Figure 4:
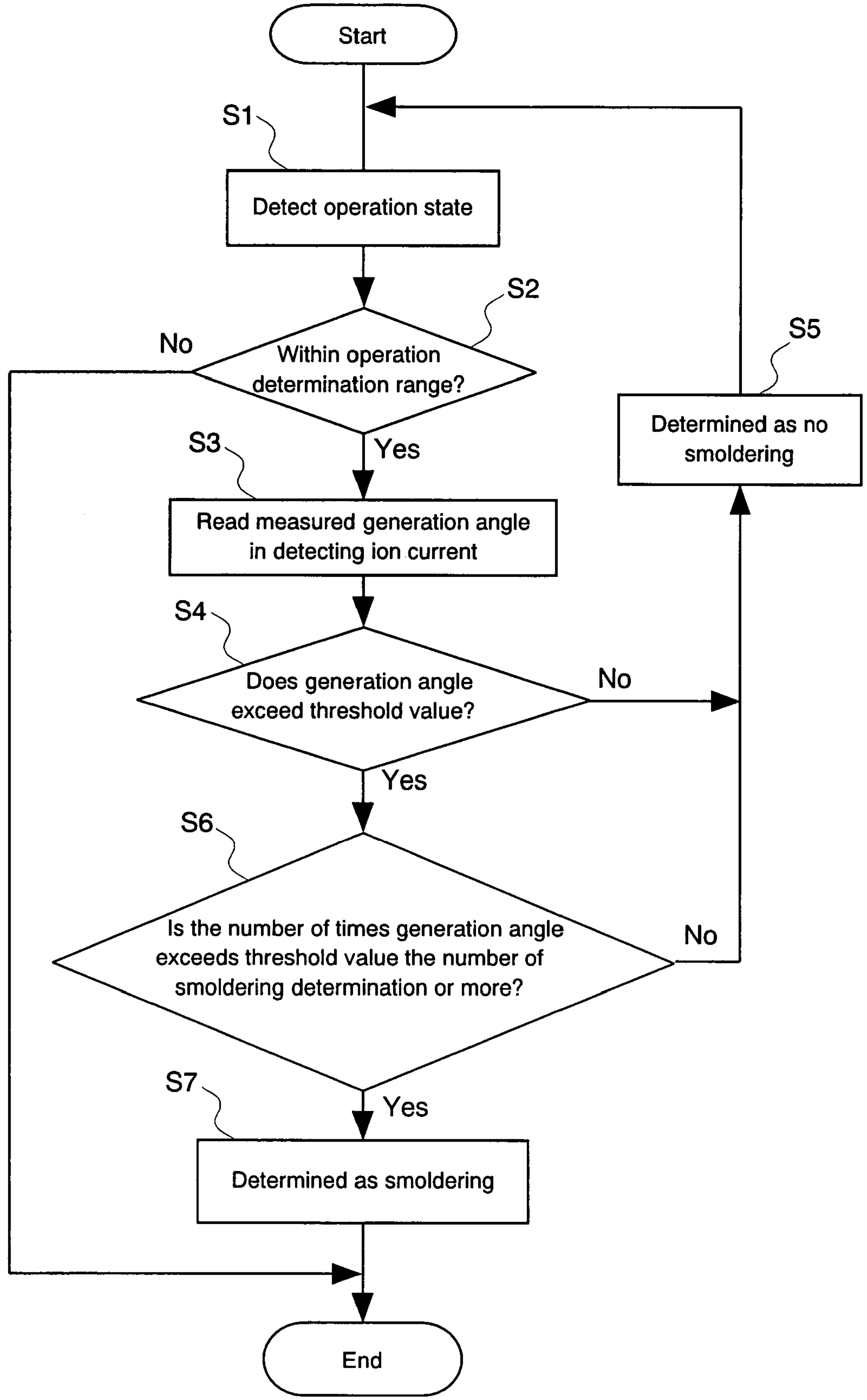
FIG. 4 is a flow chart showing control procedure in accordance with the embodiment.

FIG. 4 shows a summary of a smoldering determination program in which the operation determination range RD is set as described above. The smoldering determination program is executed after detection of the ion current which is performed at each ignition of each cylinder, that is, measurement of the generation angle GA of the ion current.

First, at a step S1, the operation state of the engine 100 is detected. The operation state of the engine 100 is detected by detecting the engine speed and the intake port pressure. Next, at a step S2, it is determined whether or not the detected engine speed and intake port pressure fall within the set operation determination range RD. That is, when the detected engine speed is the predetermined engine speed Ne1 or lower and the detected intake port pressure is closer to the atmospheric pressure than the predetermined intake port pressure PT1, determination is made that the detected operation state falls within the operation determination range RD. When the detected operation state does not fall within the operation determination range RD, this smoldering determination is finished.

When it is determined that the detected operation state falls within the operation determination range RD, at a step S3', the generation angle GA measured in detecting the ion current is read. In this case, when the spark plug 18 smolders, the leak current due to smoldering is overlapped on the ion current (shown as "ion current+leak current" in FIG. 2). Thus, the read generation angle GA is substantially the generation angle of the leak current. After that, at a step S4, it is determined whether or not the read generation angle GA exceeds a threshold value for determining smoldering. The threshold value is set as a value based on an average value of the generation angle of the ion current in the normal combustion state, for example, a value obtained by adding a few % to the average value. When the read generation angle GA does not exceed the threshold value, at a step S5, it is determined that no smoldering occurs.

On the other hand, when the read generation angle GA exceeds the threshold value, at a step S6, it is determined whether or not the number of times the read generation angle GA continuously exceeds the threshold value is a predetermined number of times, that is, the number of times of smoldering determination or more. Determination at the step S6 serves to determine whether the read generation angle GA is caused by the ion current or the leak current. When determination is made that the number of times the read generation angle GA is the number of times of smoldering determination or more at the step S6, determination is made that smoldering occurs at a step S7. On the contrary, when the number of times the read generation angle GA exceeds the threshold value is less than the number of times of smoldering determination, the procedure proceeds to the step S5 and determination is made that there is no smoldering.

The number of times of smoldering determination is set as, for example, 50 (the number of times of ignition is 50). Generally, when smoldering occurs, unless the self-cleaning function of the spark plug 18 is carried out or the spark plug 18 is replaced with a spark plug without smoldering, smoldering is not solved. On the contrary, when combustion period is long for any reason in spite of normal combustion and as a result, the ion current generation angle GA exceeds the threshold value, the normal ion current generation angle is achieved while the number of times of smoldering determination is calculated. Thus, since the generation angle does not continuously exceed the threshold value, smoldering is not determined.

In other words, at the step S6 and the step S7, in normal combustion, even when the state where the generation angle of the detected ion current exceeds the threshold value occurs a plurality of times less than the number of times of smoldering determination, it is determined that the state is not abnormal state such as smoldering of the spark plug 18. Consequently, even when the generation angle of the ion current becomes large due to influence of driving environment of the vehicle and the load applied to the engine 100, it can be avoided being wrongly determined as smoldering which is a defect of the spark plug 18.

When smoldering is determined in this manner, by turning on an indicator light such as a LED and a lamp, for example, at a position visible from the driver or in an engine room of the vehicle, an alarm may be visibly issued. The indicator light may be turned on at the time point when smoldering is determined and may be turned off at the time when smoldering is solved.

As described above, in the case where the engine 100 is in the operation state corresponding to the operation determination range RD, when the generation angle GA of the ion current on which the leak current detected by detecting the ion current in each cylinder at each ignition is overlapped exceeds the threshold value and the number of times the read generation angle GA continuously exceeds the threshold value is the number of times of smoldering determination or more, determination is made that smoldering occurs. As described above, since the ion current detection period TDP is long in the operation determination range RD set by the engine speed and the intake port pressure and the leak current certainly disappears, the ion current can be easily discriminated from the leak current and detection accuracy of smoldering can be improved.

Moreover, in this embodiment, only when the number of times the read generation angle GA continuously exceeds the threshold value is the number of times of smoldering determination or more, determination is made that smoldering occurs. Thus, the case where smoldering does not occur, combustion becomes slow for any reason in spite of normal combustion state and the generation angle of the ion current becomes large can be reliably discriminated.

Figure 5:
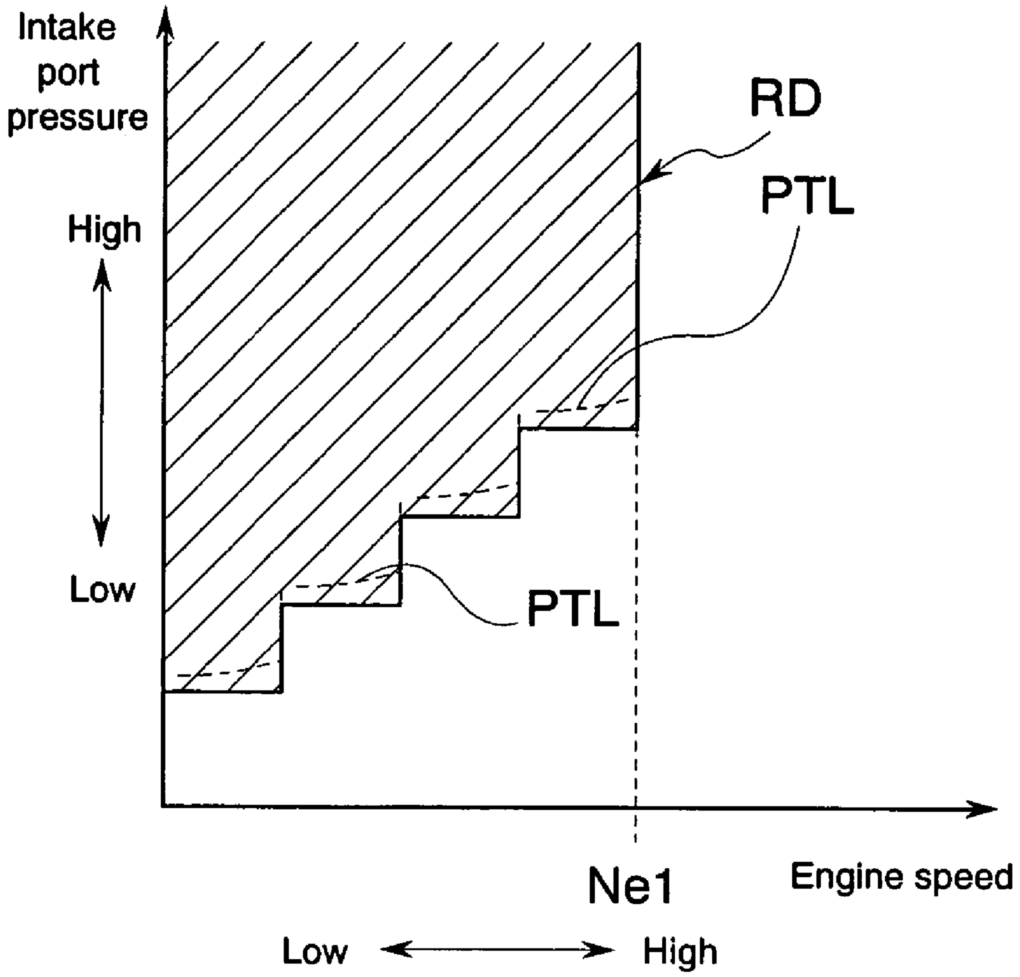
FIG. 5 is a graph showing a relationship between engine speed and intake port pressure which define an operation determination range in accordance with another embodiment.

As shown in FIG. 5, the operation determination range RD may be set so that the lower limit intake port pressure defining the operation determination range RD may get closer to the atmospheric pressure as the engine speed is increased. That is, as the intake port pressure gets closer to the atmospheric pressure and as the engine speed is increased, the temperature of the spark plug 18 is easy to become high. Thus, the amount of carbon adhered to the spark plug 18 is decreased and the leak current itself becomes small. For this reason, the time necessary for disappearance of the leak current becomes short and the ion current detection period TDP also becomes short due to high engine speed. However, since the period when the ion current on which the leak current is overlapped does not occur exists from disappearance of the leak current to end of the ion current detection period TDP, smoldering can be determined as described above.

Furthermore, as described above, by making the operation determination range narrower as the intake port pressure is increased (gets closer to the atmospheric pressure) and the engine speed is increased, when smoldering is solved on the basis of the self-cleaning function of the spark plug 18, it is possible to prevent smoldering from being wrongly determined in the operation state where the read generation angle GA exceed the threshold value.

Next, an example where the operation state is detected by detecting loads including the electrical load applied to the engine 100 in addition to the engine speed and the intake port pressure will be described.

In this example, a basic operation determination range is set as in the above-mentioned embodiment. When the load is applied to the engine 100, by increasing the intake port pressure defining the operation determination range RD by the correction amount set based on the load applied and making the substantial operation determination range narrower, smoldering is determined. The load is detected by detecting speed of the running vehicle, that transmission position of an automatic transmission is in a driving range even when the vehicle is stopped, that a blower or a fan of an alternator or an air-conditioner as electrical load operates, etc.

In this example, at the step S1 in the above-mentioned embodiment, the operation state is determined by the detected engine speed, the intake port pressure and the load. When the load is detected, the step S1 is performed and then, the predetermined intake port pressure PT1 is corrected by the set correction amount and the corrected operation determination range is set. A lower limit value PTL of the intake port pressure defining the corrected operation determination range is represented by a dotted line in FIG. 3 (this applies to the example shown in FIG. 5). After that, as in the above-mentioned embodiment, it is determined whether or not the detected operation state falls within the corrected operation determination range. When the operation state falls within the operation determination range, the measured generation angle GA is read and when the generation angle GA satisfies the conditions defined at the step S4 and the step S6, determination is made that smoldering occurs.

In the operation state where the intake port pressure changes depending on the state of the load by making the operation determination range narrower, for example, when combustion is extended by driving the engine 100 with an external driving force in spite of running and accordingly, the generation angle of the detected ion current becomes large, it is possible to prevent smoldering from being wrongly determined.

For example, operation amount of an accelerator pedal is decreased during driving down on the hill or running on a level ground, the engine 100 may be driven by wheels. In such case, although the accelerator pedal is operated, since the engine 100 is driven with the external driving force, the engine speed becomes high. As a result, an amount of the fuel with respect to an amount of sucked air becomes small and combustion becomes long. Thus, in the case where the generation angle of the ion current becomes larger depending on length of combustion and no smoldering occurs, that is, no leak current flows, when the generation angle of the ion current is continuously detected, it may be determined as smoldering.

Accordingly, in such operation state, by making a value of intake port pressure in the operation determination range larger than that in normal driving, that is, the case where the engine 100 is driven and rotated with only an internal driving force, thereby making the operation determination range smaller (making a load condition stricter), a margin for determining the operation state with respect to change in the load during driving. In this case, as described above, in consideration that the engine speed is increased due to change in the load and the generation angle of the ion current becomes larger, the correction amount of the intake port pressure is set to be larger as the engine speed is increased.

Since the operation determination range is changed depending on the state of the load applied to the engine 100, it is possible to reliably prevent the case where the generation angle of the ion current becomes larger due to change in the load from being determined as smoldering.

The present invention is not limited to the above-mentioned embodiment.

The ion current detection period TDP may be set to be 180° CA from ignition. When the ion current of each cylinder is serially input to one ion current measurement circuit and the input is processed at each ignition of each cylinder, the ion current detection period may be set in the crank angle from the ignition timing of one cylinder to the ignition timing of the next cylinder in the expansion stroke.

Short-circuit of ignition and ion detection systems including the spark plug 18 may be determined by combining the above-mentioned determination of smoldering with presence/absence of the ion current in a fuel cut during deceleration driving or deceleration driving after racing. That is, when smoldering is determined in the operation before the fuel cut is performed and the state proceeds to the operation state of the fuel cut, and then the ion current is detected in spite of absence of combustion, it is determined that the spark plug 18 is short-circuited, not smoldering occurs.

In addition, in the above-mentioned embodiment, when the ion current disappears and occurs again in the ion current detection period TDP in a repeated manner, the generation angle GA of the ion current (including the ion current on which the leak current is overlapped due to smoldering) is measured by adding together the crank angles at which the ion current is the reference level L1 or higher and it is determined whether or not the measured ion current exceeds the threshold value. However, in place of the threshold value, when a generation angle obtained by adding together angles (corresponding to CA1, CA2, CA3 in FIG. 2) at which the ion current is the reference level L1 or higher satisfies a predetermined condition, it may be determined that the ion current exceeds the threshold value in the above-mentioned embodiment.

The predetermined condition in this case includes that the generation angle is the generation angle in normal combustion state or more, or is the crank angle corresponding to a period which covers most of the ion current detection period TDP, for example, the period corresponding to 90%. By setting the predetermined condition in this manner, for example, the case where short-circuit occurs in the spark plug 18 and the ion current measurement circuit 25 which form the ion current detection system can be determined. That is, when short-circuit occurs, in detecting the ion current, a current signal which does not change may be detected. If noise is overlapped on the current signal, the current signal is divided by the noise and is different from a current signal at short-circuit. At such a short-circuit, by determining that the ion current exceeds the threshold value in the above-mentioned embodiment when the generation angle satisfies the above-mentioned predetermined condition, it is possible to prevent wrong determination that no short-circuit occurs.

The other specific configuration of each component is not limited to the above-mentioned embodiment and can be variously modified so as not to deviate from the scope of the present invention.

INDUSTRIAL APPLICABILITY

The present invention can be widely applied to a spark ignition type internal combustion engine mounted in vehicles such as automobiles in which the ion current is generated immediately after start of combustion by using the spark plug. In such internal combustion engine, it is possible to discriminate the state where smoldering occurs in the spark plug and the leak current flows from the state where no smoldering occurs and the ion current is generated for a long time. Consequently, fuel injection control and ignition timing control can be suitably carried out using the ion current.

The invention claimed is:

1. A smoldering determination method of internal combustion engine which is of a spark ignition type and has a spark plug and is mounted in a vehicle for detecting an ion current generated in a combustion chamber through the spark plug after ignition and determining smoldering of the spark plug on the basis of the detected ion current, comprising steps of:

detecting an operation state of the internal combustion engine; and determining smoldering of the spark plug based on that the detected ion current satisfies a predetermined condition when the detected operation state falls within an operation determination range set corresponding to an operation range in which an intake port pressure close to an atmospheric pressure is achieved using predetermined engine speed as an upper limit and a predetermined intake port pressure as a lower limit.

2. The smoldering determination method of internal combustion engine according to claim 1, wherein the operation determination range is made narrower when the internal combustion engine is in an operation state other than no-load operation state.

3. The smoldering determination method of internal combustion engine according to claim 1, wherein the predetermined condition is that generation period of the detected ion current exceeds a threshold value set on the basis of the ion current in the normal combustion state and the number of times the generation period exceeds the threshold value is the number of times for determination or more.

4. The smoldering determination method of internal combustion engine according to claim 2, wherein as the engine speed is increased, the intake port pressure becomes higher and the operation determination range becomes narrower.

5. The smoldering determination method of internal combustion engine according to claim 1, wherein the operation state is detected on the basis of the engine speed and the intake port pressure.

* * * * *